United States Patent

Nakao et al.

[11] Patent Number: 6,035,064
[45] Date of Patent: *Mar. 7, 2000

[54] APPARATUS AND METHOD FOR DETECTING AND RECOGNIZING CHARACTER LINE USING SIMPLIFIED PROJECTION INFORMATION

[75] Inventors: Akihiko Nakao; Koji Yura, both of Yokohama, Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/863,029

[22] Filed: May 23, 1997

[30] Foreign Application Priority Data

May 23, 1996 [JP] Japan ................................. 8-128354

[51] Int. Cl.[7] .................................................... G06K 9/48
[52] U.S. Cl. ............................................ 382/200; 382/174
[58] Field of Search .................................. 382/200, 101, 382/175, 174, 177

[56] References Cited

U.S. PATENT DOCUMENTS 4,527,283  7/1985  Ito et al. ................................. 382/174
5,737,437  4/1998  Nakao et al. ........................... 382/101

FOREIGN PATENT DOCUMENTS 0 332 471  3/1989  European Pat. Off. ......... G06K 9/68
6-203201   7/1994  Japan ............................... G06K 9/20
7-265807  10/1995  Japan ............................... B07C 3/14

OTHER PUBLICATIONS

Nkano et al., "An Algorithm for the Skew Normalization of Document Image", Proceedings of the International Conference on Pattern Recognition, Atlantic City, Jun. 16–21, 1990, vol. 2, No. Conf. 10, Jun. 16, 1990, pp. 8–13.

"Line Segmentetion Method for Document in European Languages", IBM Technical Disclosure Bullentin, vol. 33, No. 1B, Jun. 1990, pp. 207–210.

KIM, "Baseline Drift Correction of Handwritten Text", IBM Technical Disclosure Bulletin, vol. 25, No. 10, Mar. 1983, pp. 5111–5114.

*Primary Examiner*—Jose L. Couso
*Assistant Examiner*—Anh Hong Do
*Attorney, Agent, or Firm*—Pillsbury Madison Sutro LLP

[57] ABSTRACT

A character line recognition apparatus including an image input section for binarizing an inputted document image so as to output a binarized image, an extracting section for obtaining a combining component of a black pixel from the binarized image so as to convert the combining component into circumscribed rectangular data, a calculating section for calculating out simplified projection information based on a prescribed function into which the circumscribed rectangular data, a calculating section for calculating line direction projection information based on the prescribed function as the simplified projection information, and a detecting section for detecting a character line on the document image based on the line direction projection information.

20 Claims, 14 Drawing Sheets

APPARATUS AND METHOD FOR DETECTING AND RECOGNIZING CHARACTER LINE USING SIMPLIFIED PROJECTION INFORMATION

BACKGROUND OF THE INVENTION

The present invention relates to a character detecting method which detects a character line from a document image when a document written on paper is directly read and its characters are recognized in, for example, an optical character reader (OCR), and relates to a character recognition apparatus using the character detecting method.

For example, in a character recognition device which reads a handwritten or printed document through an image reader such as a scanner, and takes out document information by recognizing characters from the read document image, a process for allocating characters or a character line from the document image is required.

An example of the method for detecting a character line is a method for obtaining rectangular information which is circumscribed with a group of black pixels on the image and the rectangular information is integrated so that a character line is detected. In this character line detecting method, an image of a document read by a scanner, etc. undergoes a differential and binary process so that a binarized image is obtained. Moreover, an image area where black pixels are bound on the binarized image is obtained, and rectangular information which is circumscribed with this area is obtained. Thereafter, circumscribed rectangular areas are integrated based on shapes and positions of the rectangular areas so that a line candidate area is allocated.

As to the line area candidate allocated in this manner, the circumscribed rectangular information is not accurate because, for example, a document read by a scanner, etc. is stained, a line is slanted, a size of characters in one line is not uniform. As a result, one line is occasionally allocated as a plurality of divided lines, or a plurality of adjacent lines are occasionally allocated as one line.

Therefore, in the conventional line detecting method, projection information within the candidate areas is calculated, and line candidate areas are integrated and divided. Namely, when a binarized image in the line candidate area is allocated, the projection information in a line direction is calculated according to the following procedure.

First, each pixel in the line area candidate is evaluated, and when the picture element is a black pixel, a projection value, which is in a position where the pixel was projected in a line direction, is increased so that the projection information is updated.

When the evaluation of all the pixels is ended, the projection information in the line direction is obtained. For example, in the case where a black pixel on a line image 101 shown in FIG. 3, is projected in the line direction, a result 103 is obtained.

A judgment is made based on the projection information in each line candidate area obtained in such a manner as to whether or not a separate position of the line candidate is detected or each line candidate area is integrated, and a line is finally detected.

However, in the conventional line detecting method, it is necessary to make a judgment as to whether or not pixels in the line candidate areas are, one by one, black pixels, and if they are black pixels, to add them to projection information. For this reason, many calculations are required for one line, and dedicated hardware is required for high-speed calculations.

In addition, in the case where line candidates are divided and integrated many times, processing time increases.

Furthermore, since characters which belong to a line are treated as image information, accuracy of the detection of a character line is low, for example, in the case where characters are written at a slant in a document.

BRIEF SUMMARY OF THE INVENTION

It is an object of the present invention to provide a high-speed line detecting method in which accuracy of the line detection is high and to provide a character recognition apparatus using the method.

The present invention is a character line recognition apparatus including means for binarizing an inputted document image so as to output a binarized image, means for obtaining a combining component of a black pixel from the binarized image so as to convert the combining component into circumscribed rectangular data, means for calculating simplified projection informations, based on a prescribed function, of the circumscribed rectangular data; means for calculating line direction projection information, based on the prescribed function, of the circumscribed rectangular data, and means for detecting a character line on the document image based on the line direction projection information.

The present invention having the above arrangement functions as follows. Namely, the circumscribed rectangular data, where the binarized image is converted based on the document image, is not directly processed in a conventional manner, but are simplified so as to be replaced by rectangular approximate data. Thereafter, when the simplified rectangular approximate data is substituted into a prescribed equation, a character line can be detected at a higher speed than the conventional method.

In addition, the present invention is a character line recognition apparatus including means for binarizing an inputted document image so as to output a binarized image, means for obtaining a combining component of a black pixel from the binarized image so as to convert the combining component into circumscribed rectangular data, means for calculating simplified projection informations based on a prescribed function, of the circumscribed rectangular data; means for calculating line direction projection information (equation), based on the prescribed function, of the circumscribed rectangular data, means for detecting a character line on the document image based on the line direction projection information, and means for recognizing characters included in the character line detected by the detecting means.

Also in the above arrangement, the simplified rectangular data can be processed in the same manner, and the character line can be detected quickly, thereby making it possible to recognize characters more quickly.

In addition, the method of the present invention also produces the same effects based on the above same characteristics.

For a fuller understanding of the nature and advantages of the invention, reference should be made to the following detailed description taken in conjunction with the accompanying drawings.

Additional objects advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The following describes the first embodiment of the present invention on reference to the drawings.

Figure 1:
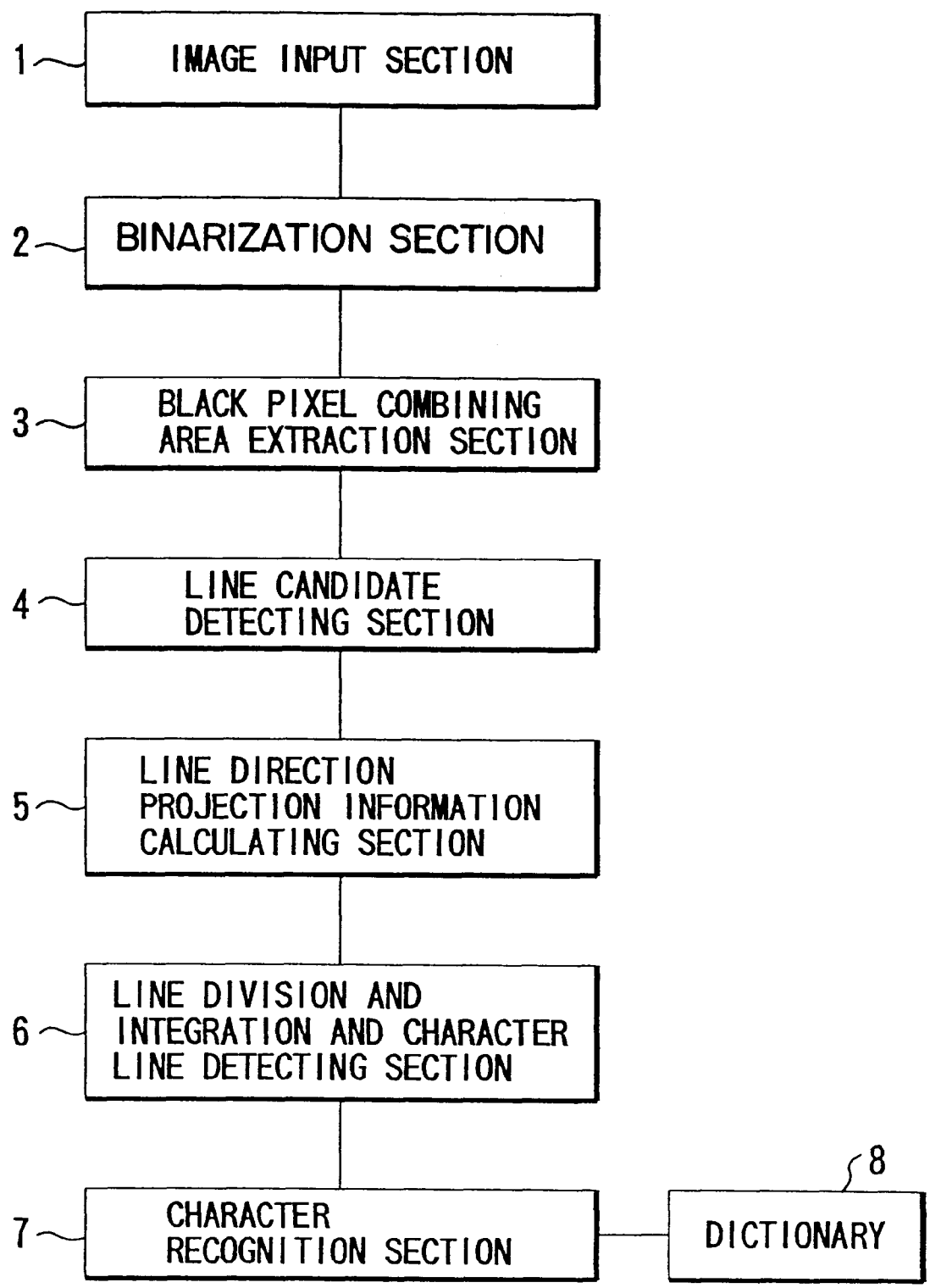
FIG. 1 is a schematic drawing which shows an arrangement of a character recognition apparatus using a line detecting method according to one embodiment of the present invention.

FIG. 1 shows an arrangement of a character recognition apparatus to which the line detecting method according to the present embodiment is applied. This apparatus, for example, directly reads characters written on paper as an optical character reader (OCR) used in a computer, or recognizes address information from an image of the document when this apparatus is used in a mail processing system, etc.

In FIG. 1, an image input section 1 is composed of a scanner, etc., and, for example, it optically reads an image on a document and converts the read image into an electrical signal so as to output the signal. Characters processed here may be either handwritten characters or printed characters.

The document image read by the image input section 1 undergoes a predetermined binarizing process in a binarize processing section 2 so that a binarized image is obtained, and the binarized image is sent to a black pixel combining area extracting section 3.

The black pixel combining area extracting section 3 extracts an area where black pixels of the binarized image of the document are bound, and obtains rectangular information which is circumscribed within each area. The circumscribed rectangular information in each black pixel binding area obtained here is sent to a line candidate detecting section 4.

The line candidate detecting section 4 integrates the circumscribed rectangular areas, based on the shapes and positions of the rectangular areas included in each rectangular information, so as to allocate a line candidate area, and extracts the rectangular information of the line candidate. The rectangular information in each line candidate area and the circumscribed rectangular information in the black pixel combining area, included in the rectangular information (hereinafter, it is occasionally called black pixel circumscribed rectangular information), are stored in a predetermined memory.

A line direction projection information calculating section 5 calculates projection information in line directions of each allocated line candidate. The details thereof are mentioned later.

A line dividing and integrating section 6 divides and integrates line candidate areas based on the calculated projection information so as to finally detect character lines. The details thereof are mentioned later.

A character recognition section 7 detects characters from the detected character lines so as to recognize characters by referring to dictionary 8 which is provided to the character recognition section 7.

The detecting method of the present invention is particulary characterized by the processes of the line direction projection information calculating section 5 and the line dividing and integrating section 6.

Figure 2:
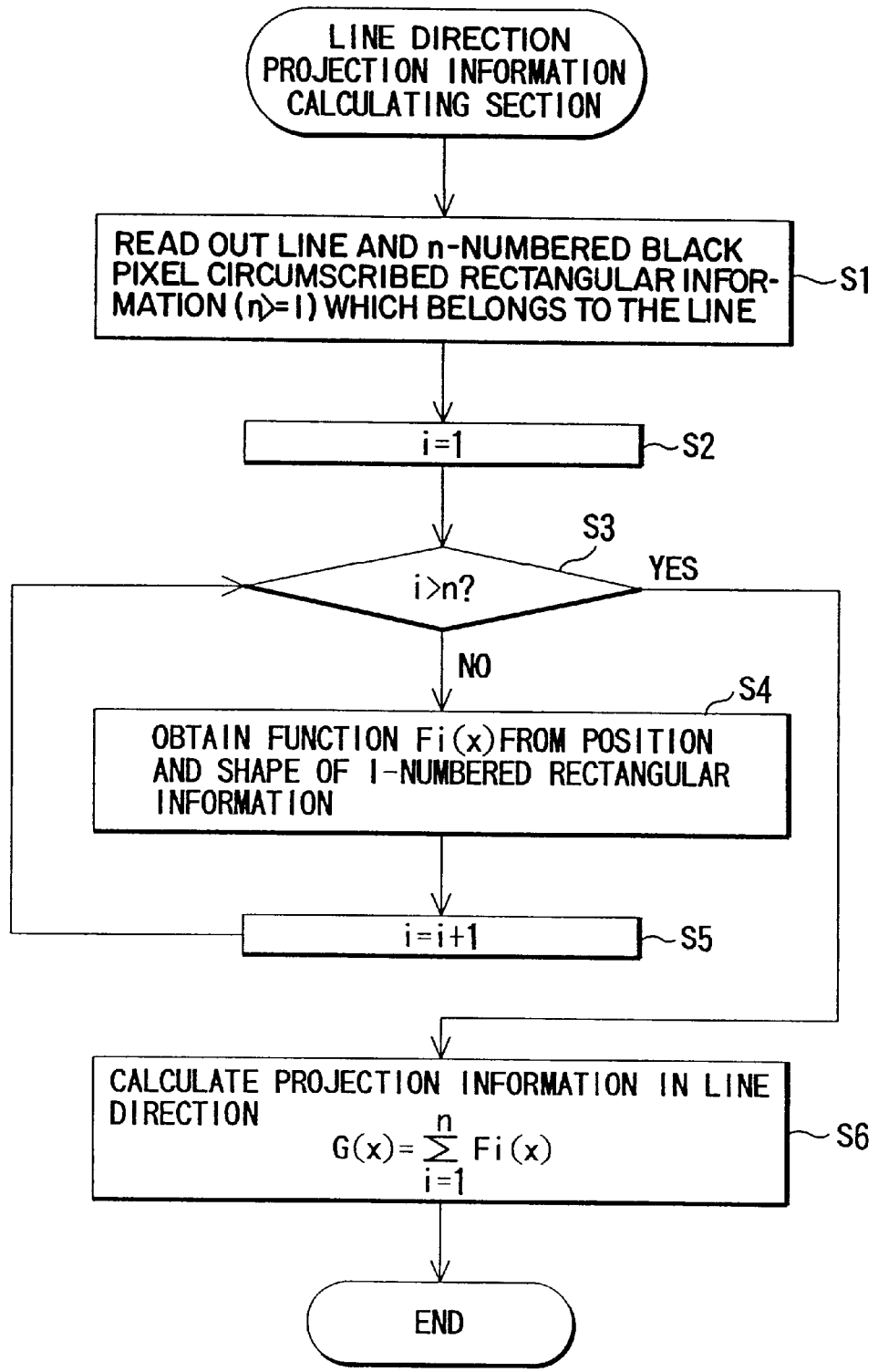
FIG. 2 is a flow chart which explains a line direction projection information calculating operation.

The following describes a calculating process of the line direction projection information in the line candidate areas in the line direction projection information calculating section 5 with reference to the flow chart shown in FIG. 2.

First, rectangular information of a line candidate whose projection information is desired, and n-numbered (n≧1) black pixel circumscribed rectangular information, which belongs to the line candidate, are read out from the prescribed memory (S1).

Next, as to each of the n-numbered black pixel circumscribed rectangles (S2), a function $F_i(x)$ ($1 \leq i \leq n$) corresponding to one circumscribed rectangle is obtained based on the position and shape of the line candidate according to the following procedure (S4). At this time, a direction of x axis is vertical to the line direction, and a coordinate system may be a relative coordinate system with respective to the lines, or a coordinate system of a document may be directly used.

The functions $F_i(x)$ are obtained as to all the black pixel circumscribed rectangles which belongs to the line candidates (S3 through S5).

Next, G(x), which is defined by an equation (1) obtained by adding the functions $F_i(x)$ as to all the black pixel circumscribed rectangles (i=1 to n) to each other, is calculated (S6).

Here, G(x) is obtained by integrating a plurality of circumscribed rectangles of one line candidate.

$$G(x) = \sum_{i=1}^{n} F_i(x) \qquad (1)$$

Namely, G(x) can be regarded as projection information in the line direction calculated from the black pixel circumscribed rectangular information.

Figure 3:
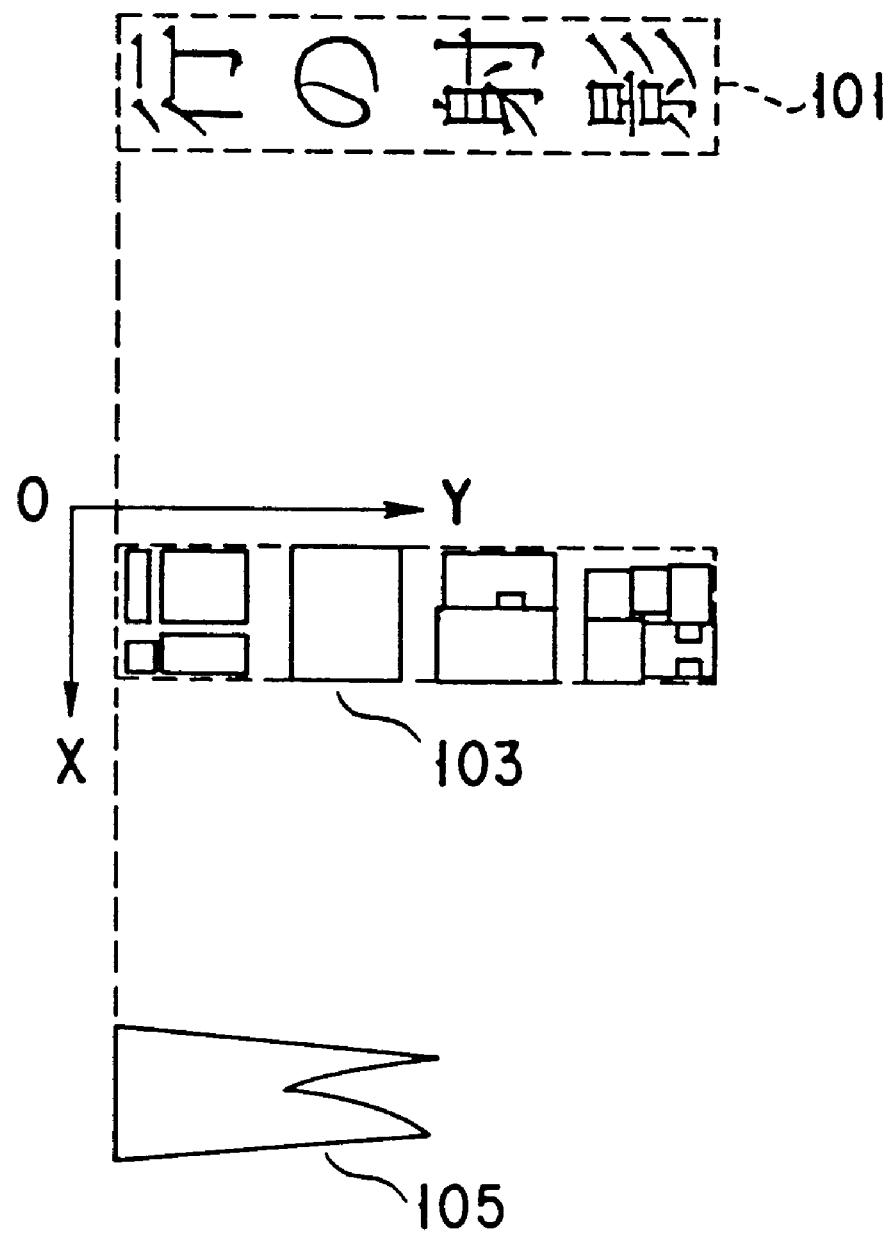
FIG. 3 is a drawing which explains line direction projection information.

For example, when a line candidate 101, which is detected from an image on a document read by the image input section 1, is as shown in FIG. 3, the line candidate is composed of a black pixel circumscribed rectangle 103 shown in FIG. 3. At this time, when the process of FIG. 2 is carried out, the line direction projection information G(x), which is finally calculated at S6, represents projection information 105 having a shape shown in FIG. 3.

Figure 4:
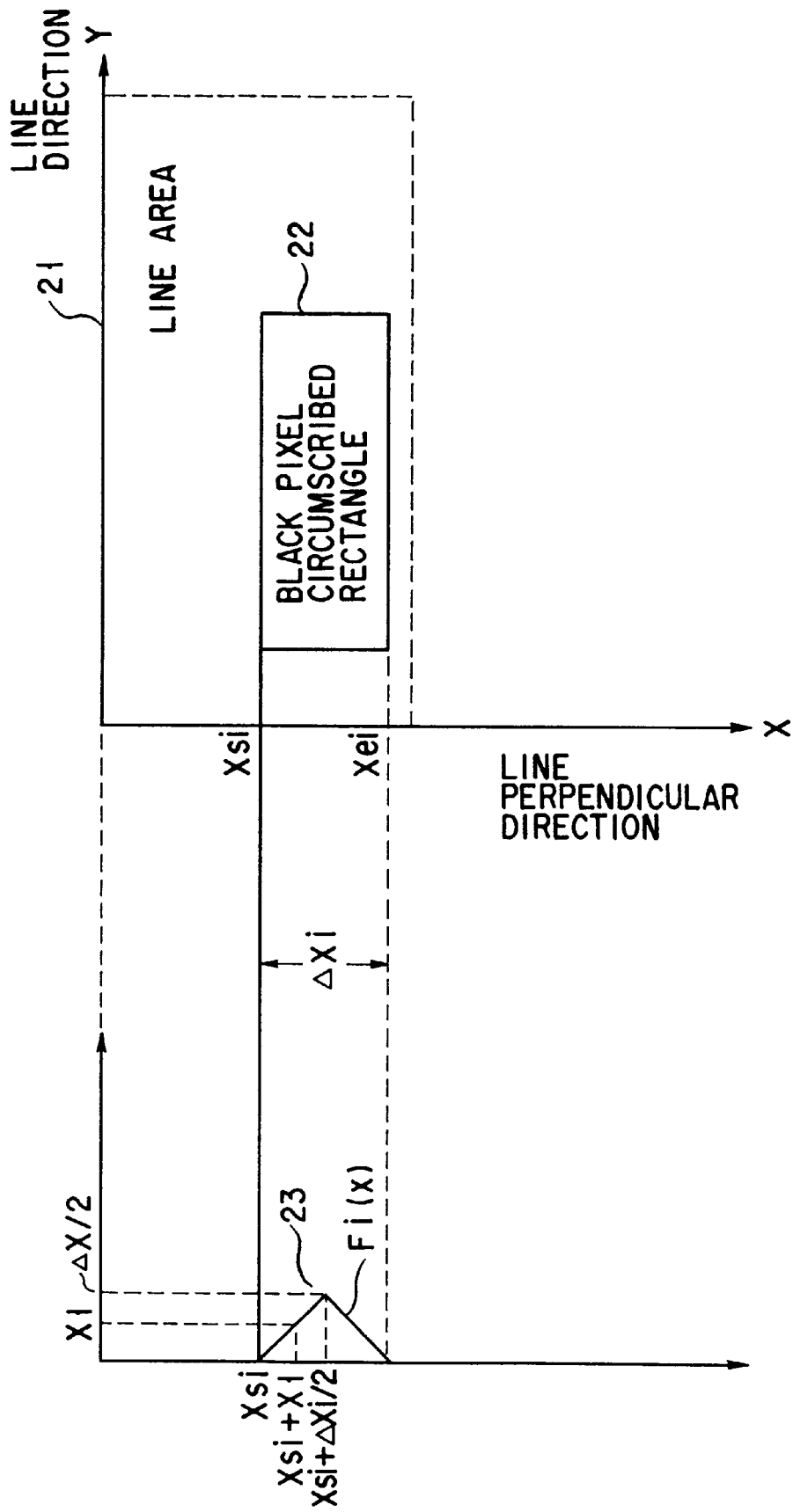
FIG. 4 is a drawing which concretely explains one example of the line direction projection information calculating process using an equation (2)

The following describes one concrete example of the method of calculating the function Fi(x) from the black pixel circumscribed rectangle with reference to FIG. 4.

In FIG. 4, when a relative coordinate system with respect to a line candidate area 21 is considered, the Y axis is taken in the line direction, and the X axis is taken in a direction which is perpendicular to the line (direction which intersects perpendicularly to the line direction). In the case where the i-numbered black pixel circumscribed rectangle 22, which belongs to the line candidate area 21 exists within the range of $X_{si}$ to $X_{ei}$ in the X-axial direction, $F_i(x)$ which is one rectangular information is defined by an equation (2).

$$F_i(x) = \begin{cases} a(x - X_{si}), & \text{if } X_{si} \leq x < (X_{si} + X_{ei})/2 \\ a(X_{ei} - x), & \text{if } (X_{si} + X_{ei})/2 \leq x \leq X_e \end{cases} \qquad (2)$$

The case where a constant a=1 in the equation (2) is shown in FIG. 4. The constant a is not limited to "1", so it may have any value.

The function $F_i(x)$ represented by the equation (2), as shown in FIG. 4, has an isosceles triangular-shape such that a maximum value (for example, ΔX/2) is obtained at the center ($X_{si}$+ΔX/2) of a range ΔX (=$X_{ei}$−$X_{si}$) in the line perpendicular direction (direction x) of the black pixel circumscribed rectangle 22, and a minimum value (for example "0") is obtained at two edge points in the direction x of the black pixel circumscribed rectangle 22. However, this is because character line density is generally concentrated at the center of the character line, and a projection value becomes high. Namely, it is desirable that the function $F_i(x)$ is defined so that the peak of the projection value comes to the center of the line, so it is not particularly limited to the equation (2).

In the equation (2), a represents the constant, but a may be a function of the position and shape of the black pixel circumscribed rectangle.

The following equation (3) shows one example of the case where a of $F_i(x)$ defined by the equation (2) is a function of $\Delta X_i$ and $\Delta Y_i$. Here, $\Delta X_i$ and $\Delta Y_i$ are respectively:

$$\Delta X_i (= X_{ei} - X_{si}) \qquad (3)$$

$$\Delta Y_i (= Y_{ei} - Y_{si})$$

$$F_i(x, \Delta X_i, \Delta Y_i) = \begin{cases} E(\Delta X_i, \Delta Y_i)(x - X_{si}), & \text{if } X_{si} \leq x < (X_{si} + X_{ei})/2 \\ E(\Delta X_i, \Delta Y_i)(X_{ei} - x), & \text{if } (X_{si} + X_{ei})/2 \leq x \leq X_{ei} \end{cases}$$

Here, E (ΔX,ΔY)=aΔY/ΔX

Figure 5:
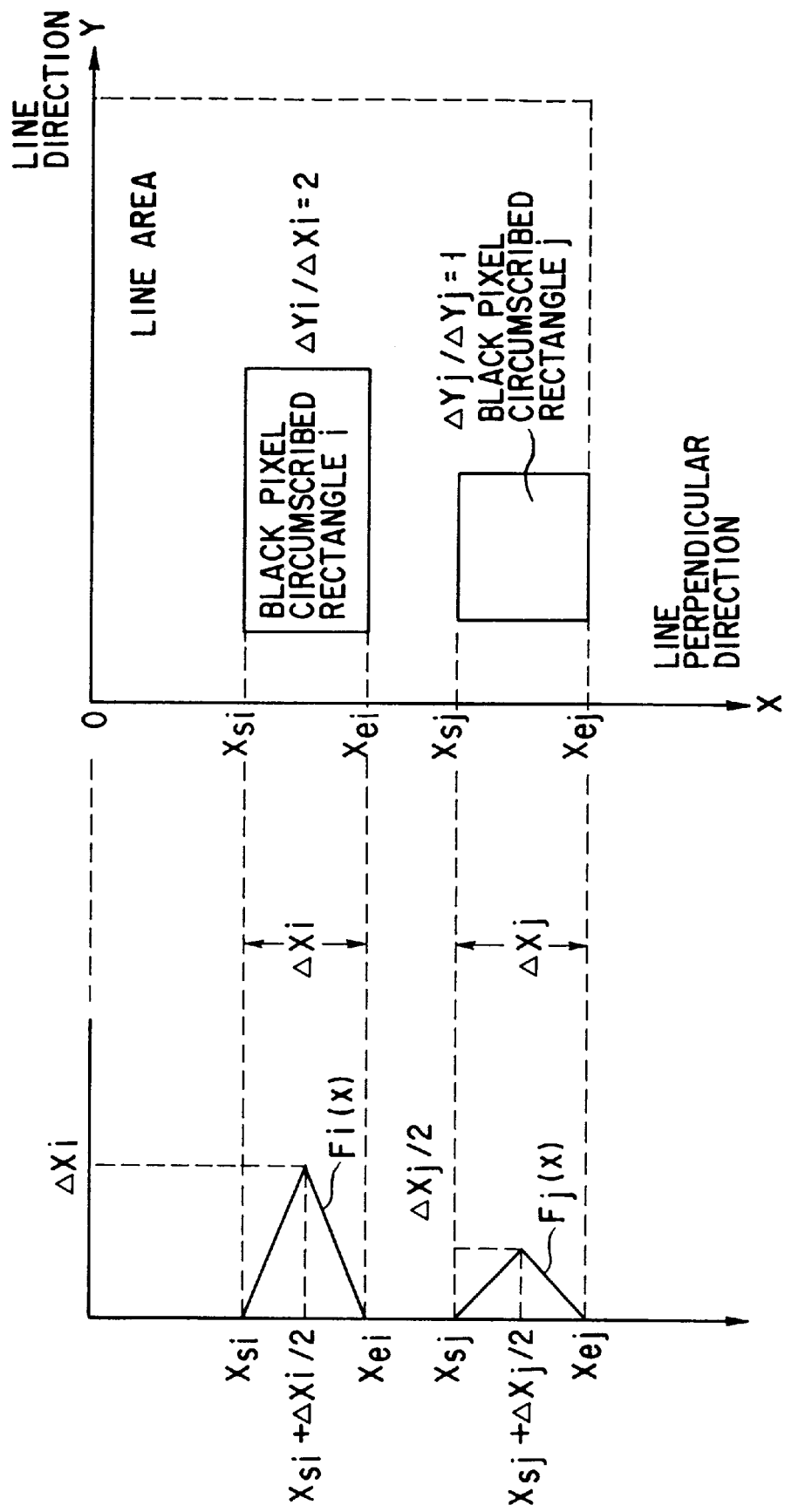
FIG. 5 is a drawing which concretely explains another example of the line direction projection information calculating process using an equation (3)

The case where the constant a=1 in the equation (3) is shown in FIG. 5. Here, the constant a is not limited to "1", so it may be any value.

A function E in the equation (3) may be a function of a position of the black pixel circumscribed rectangle i.

The following equation (4) is one example of the case where the function E is a function of a position ($X_{gi}$,$Y_{gi}$) of the gravity center of the black pixel circumscribed rectangle i. Here:

$$(X_{gi}, Y_{gi}) = ((X_{si} + X_{ei})/2, (Y_{si} + Y_{ei})/2). \qquad (4)$$

$$E_i(Y_{gi}) = \begin{cases} a, & \text{if } Y_{gi} \leq Y_1 \\ b, & \text{if } Y_{gi} > Y_1 \end{cases}$$

Figure 6:
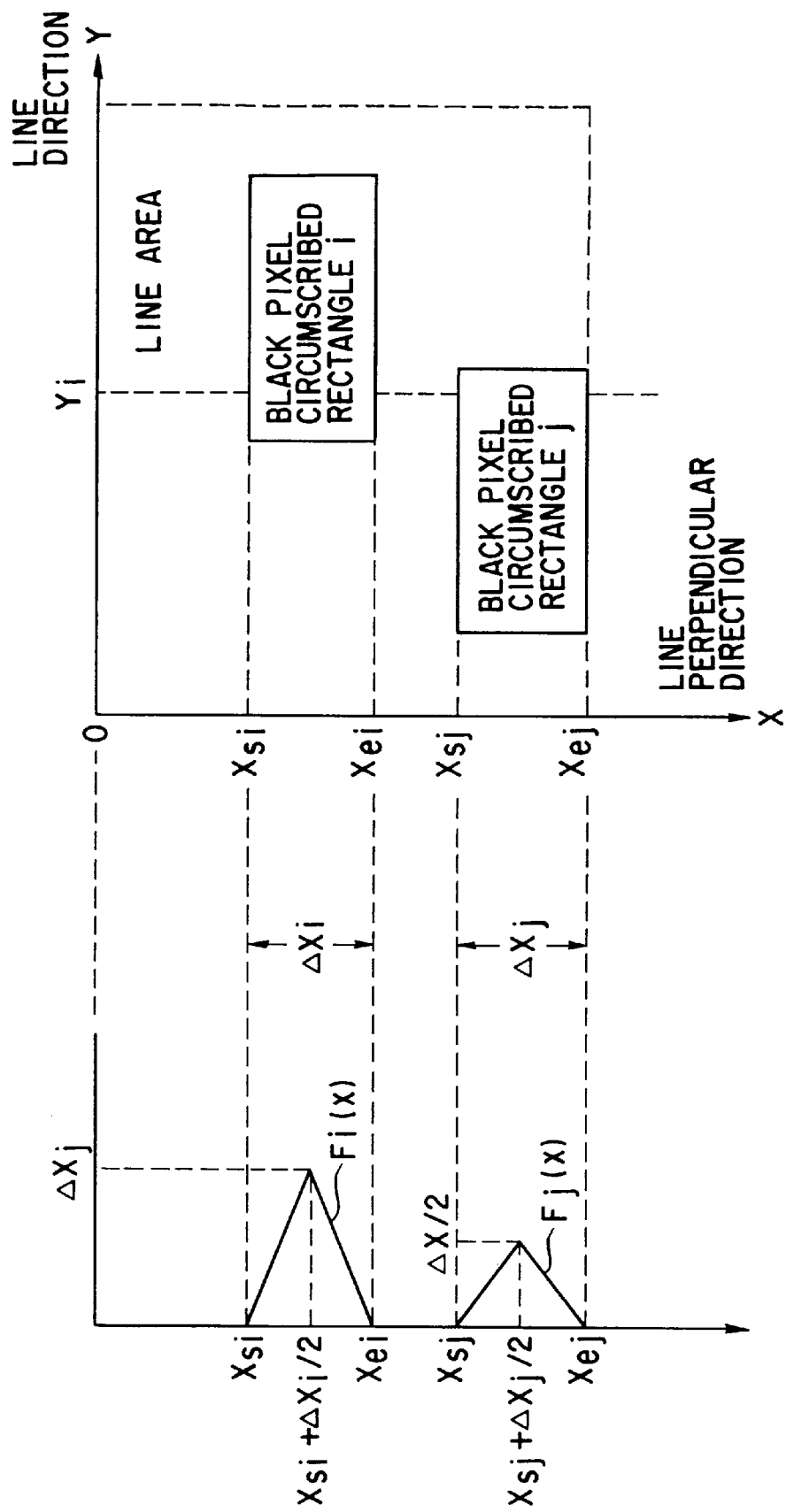
FIG. 6 is a drawing which concretely explains still another example of the line direction projection information calculating process using an equation (4)

The case where a=1, b=2 in the equation (4) is shown in FIG. 6. In FIG. 6, the value of $Y_i$ is a constant, but it may be a value defined by any function, so it may be a value calculated from line area position information to which the black pixel circumscribed rectangle belongs.

In addition, the function $F_i(x)$ may be, as represented by the equation (5), represented by n (≧2) order equation.

$$F_i(x) = \begin{cases} a(x - X_{si})^n, & \text{if } X_{si} \leq x < (X_{si} + X_{ei})/2 \\ a(X_{ei} - x)^n, & \text{if } (X_{si} + X_{ei})/2 \leq x \leq X_e \end{cases} \qquad (5)$$

Figure 7:
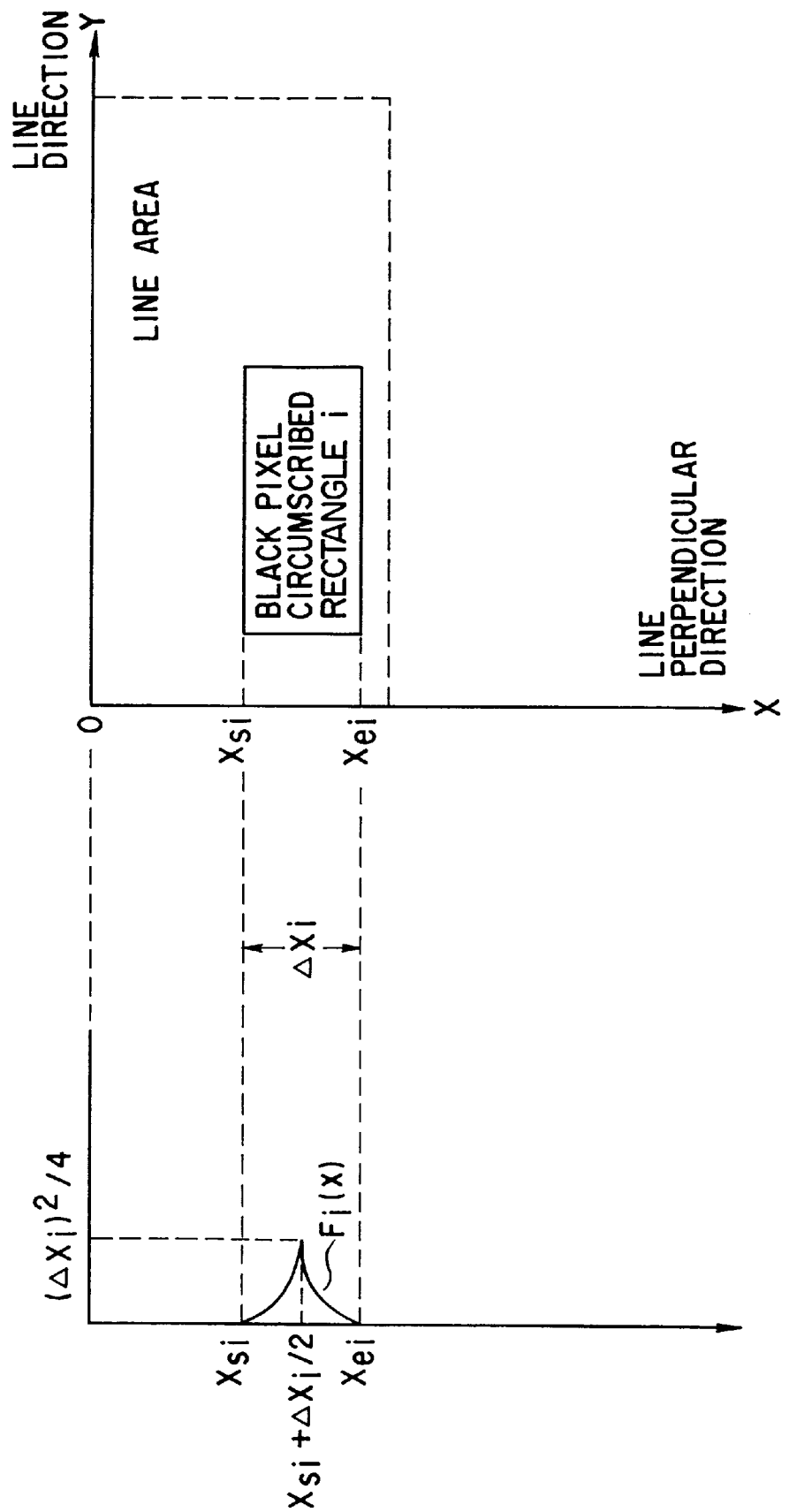
FIG. 7 is a drawing which concretely explains still another example of the line direction projection information calculating process using an equation (5)

The case where the constant a=1, n=1 in the equation (5) is shown in FIG. 7. In the equation (5), the constant a may obtain a value other than "1".

Furthermore, the function $F_i(x)$ is not limited to an isosceles triangular shape, so $F_i(x)$ may be a trapezoidal shape. The function $F_i(x)$ in this case is represented in the equation (6).

$$F_i(x) = \min(P_i(x), Q_i(\Delta X_i, \Delta Y_i)) \qquad (6)$$

$$\begin{cases} P_i(x) = \begin{cases} a(x - X_{si})^n, & \text{if } X_{si} \leq x < (X_{si} + X_{ei})/2 \\ a(X_{ei} - x)^n, & \text{if } (X_{si} + X_{ei})/2 \leq x \leq X_e \end{cases} \\ Q_i(\Delta X_i, \Delta Y_i) = b\Delta Y_i \end{cases}$$

Figure 8:
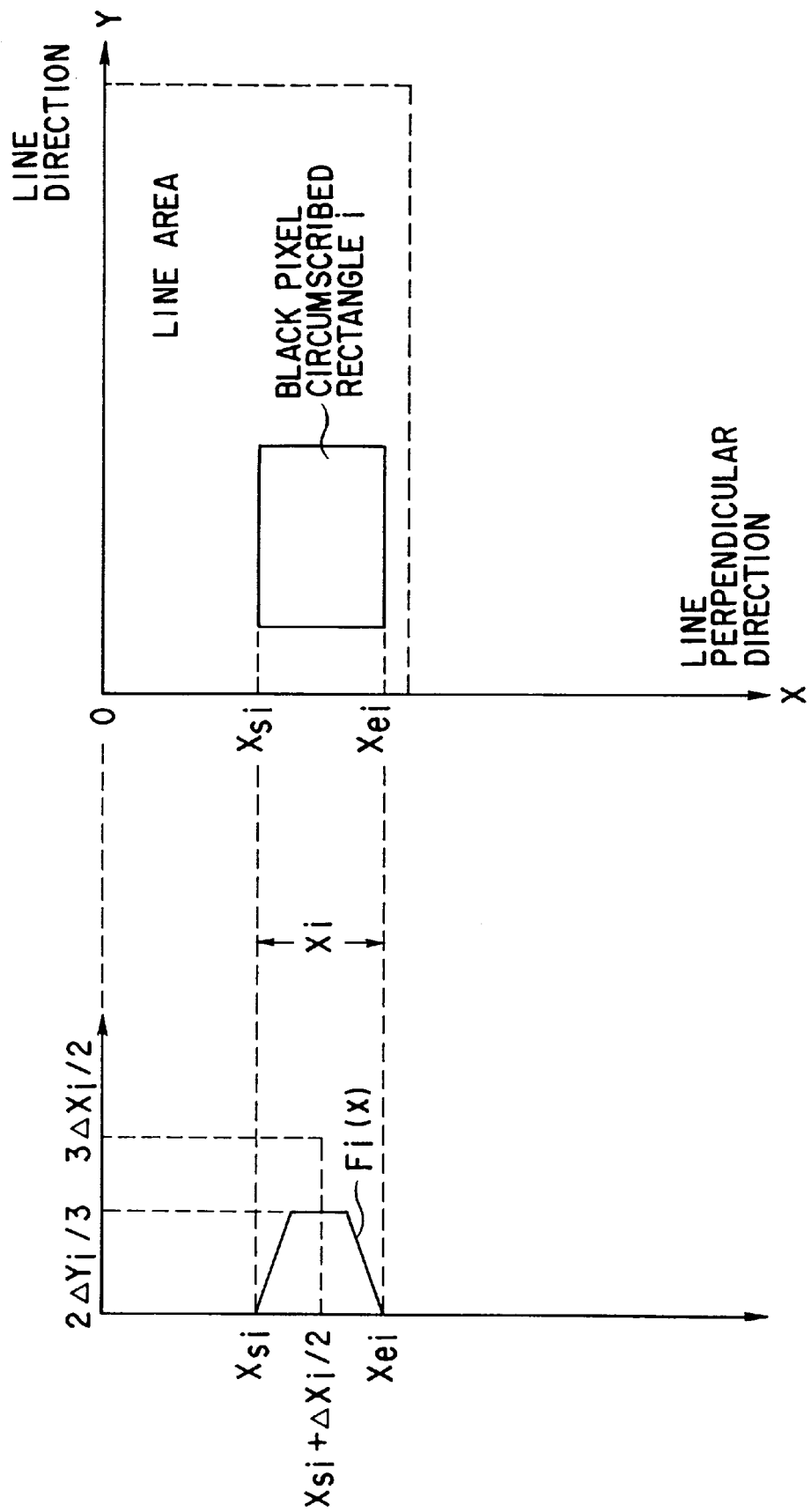
FIG. 8 is a drawing which concretely explains still another example of the line direction projection information calculating process using an equation (6)

The case where the constant a=3, b=⅔, n=1 in the equation (6) is shown in FIG. 8. A function $Q_I$ defined in the equation (6) is only a function of $\Delta X_i$, and a and b are constants, but a and b may be functions of the position and shape of the black pixel circumscribed rectangle.

When the projection information of the circumscribed rectangle unit is simply obtained by simple functions in this manner instead of by adding the black pixels, a high-speed process becomes possible.

In addition, in FIGS. 4 through 8, the relative coordinate with respect to the lines is used as the coordinate system of the black pixel circumscribed rectangle, but the coordinate system of the document image may be used.

When the functions $F_i(x)$, which are calculated from all the black pixel circumscribed rectangles in the line candidate area 21 are added to each other, the line direction projection information G(x) in the line candidate area 21 can be obtained according to the equation (1), but the line direction projection information G(x) represents a pixel point distribution projection of the line candidate area 21 after all. Then, when the position of the maximum point of the line direction projection information G(x) approximately coincides with the center position of the line candidate area 21 and only one exists, it is strongly possible that the line candidate area is a character line which does not require division.

Figure 9:
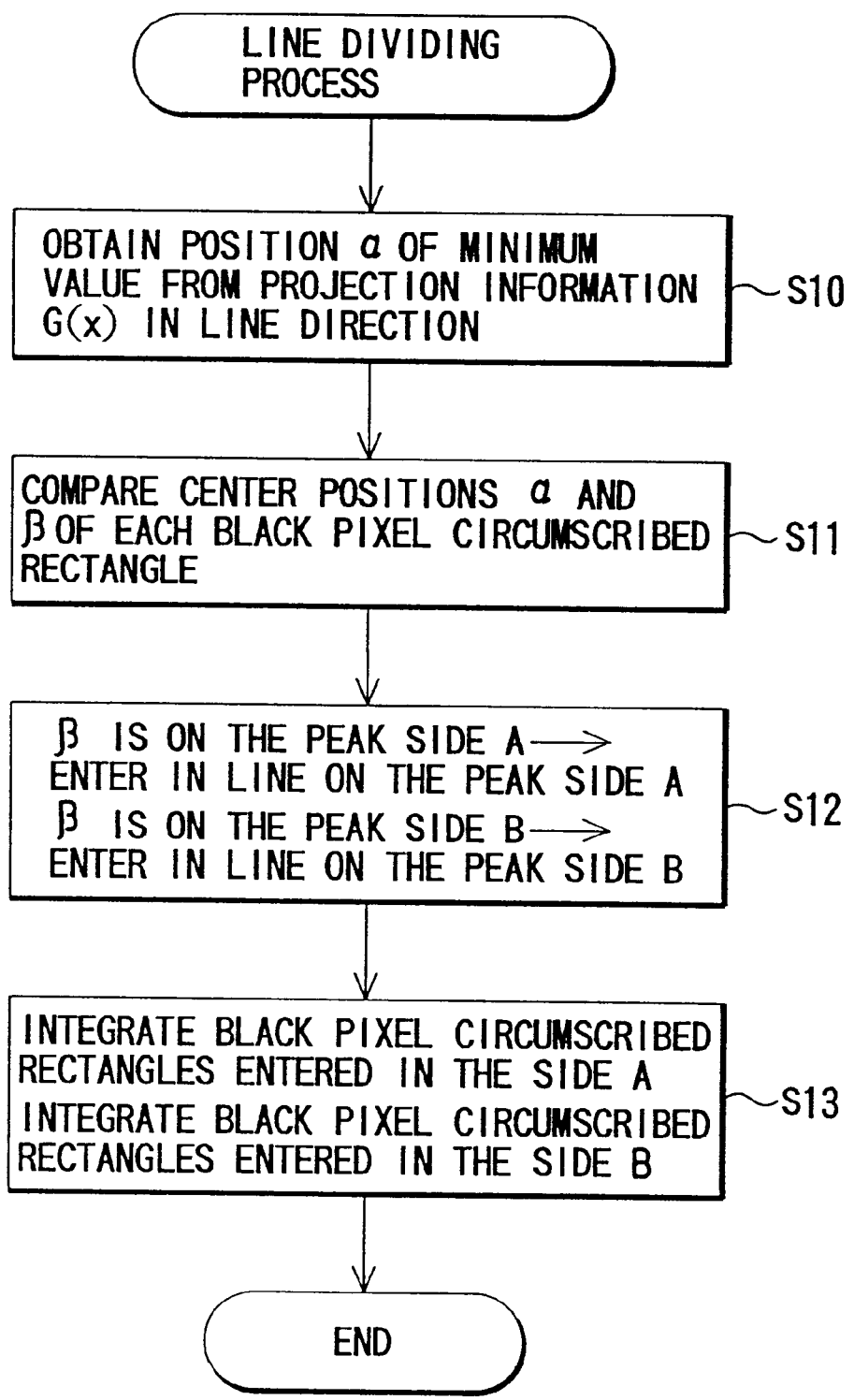
FIG. 9 is a drawing which explains a line dividing process.

The following describes the line dividing process in the line dividing and integrating section with reference to the flow chart shown in FIG. 9.

In the line candidate detecting section 4 in FIG. 4, in the case where, for example, a document is stained, a line is slanted, and a character size is not uniform, it is strongly possible that a plurality of adjacent lines are detected as one line candidate area.

Therefore, when an original plurality of lines, which were detected as one line, are divided, in one method, positions where the projection information, which is made by projecting pixels of a binarized image in the line candidate area in the line direction, obtain maximum and minimum values are found, and if the minimum value is smaller than a reference value obtained by a prepared method, the line is divided into two in the line perpendicular direction in a position where the projection information obtains the minimum value.

However, in this method, since the process is carried out on a pixel unit, when the character line is slanted with respect to the coordinate system of the document, adjacent line areas are overlapped with each other when line information is allocated from the document. Therefore, a problem exists, such that a portion of the adjacent lines is captured when the line is divided and is divided again.

Therefore, the line dividing process according to the present invention is characterized by a line dividing position being obtained by using the black pixel circumscribed rectangular information in the line candidate area.

A description of the line dividing process is given in the case where the y axis is taken in the line direction and the x axis is taken in the line perpendicular direction.

First, a position a of the minimum value of line direction projection information G(x) in each line candidate area, which is calculated by the line direction projection information calculating section 5, is obtained (S10).

Figures 10A, 10B:
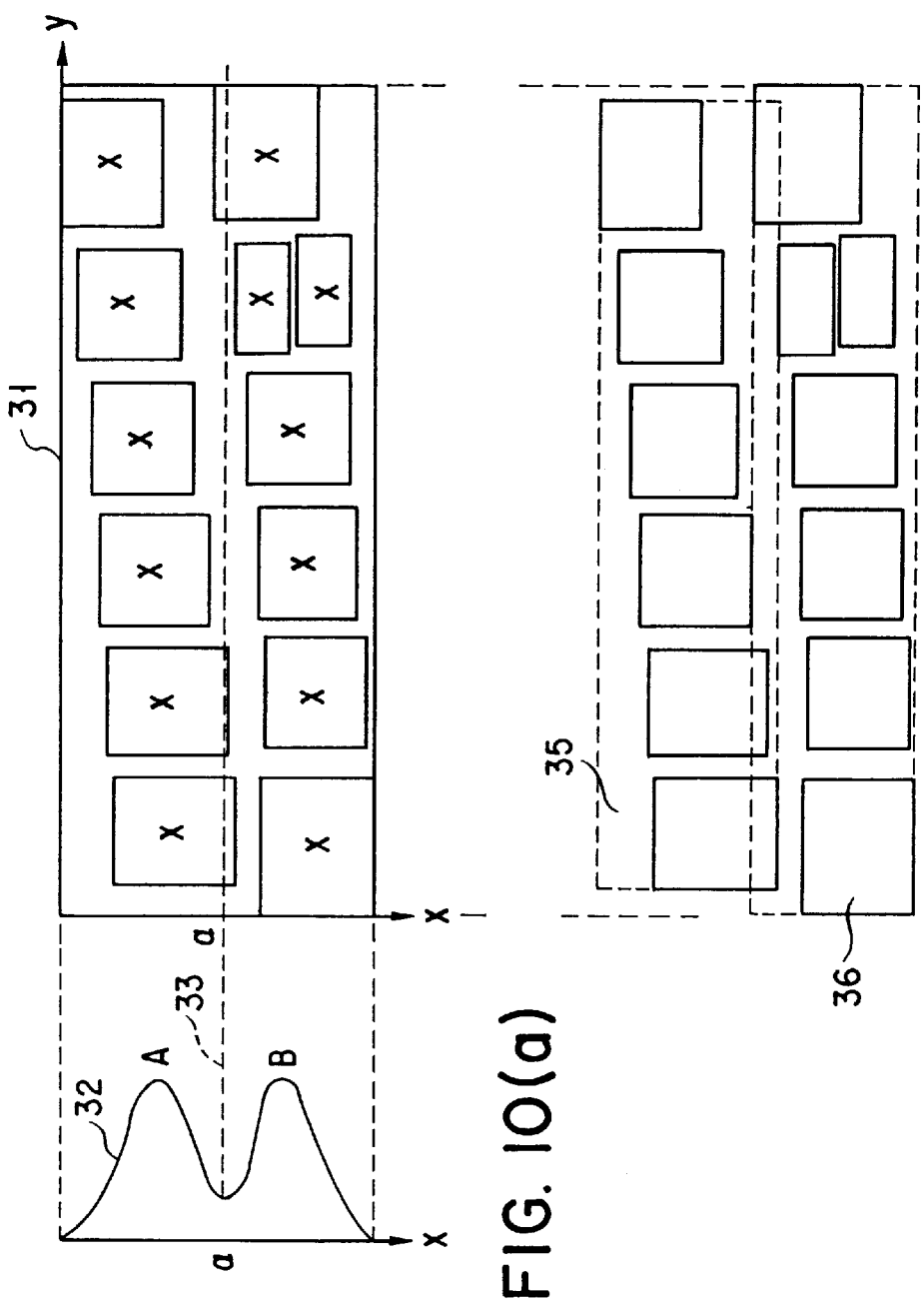
FIG. 10 is a drawing which concretely explains the line dividing process in FIG. 5.

Namely, as shown in (a) on FIG. 10, according to the line direction projection information G(x) in the line candidate area 31, in the case where a pixel point distributing projection 32 in a line candidate area 31 has two maximum points A and B and one minimum value between A and B, it is strongly possible that two lines are mixed in the line candidate area 31.

When the minimum value is compared with a predetermined reference value, and if it is smaller than the reference value, the line is divided in the line perpendicular direction on a basis of a straight line x=α (33).

When the line is divided, gravity center positions (marked with x in FIG. 10) of the black pixel circumscribed rectangles are obtained, an evaluation is made as to which side of a boundary x=α the gravity center is positioned. For example, if the gravity center of the black pixel circumscribed rectangle is close to a maximum point position A in FIG. 10, a judgment is made that the black pixel circumscribed rectangle belongs to a line on side A, and if the gravity center is close to a maximum point position B, the black pixel circumscribed rectangle belongs to a line on side B. Then, they are stored distinctively (S12).

When the evaluation at S11 and S12 as to all the black pixel circumscribed rectangles in the line candidate area 31 is finished, as shown in (b) on FIG. 10, the black pixel circumscribed rectangles which belong to the side B are integrated so that a new line 36 is extracted (S13).

Figure 11:
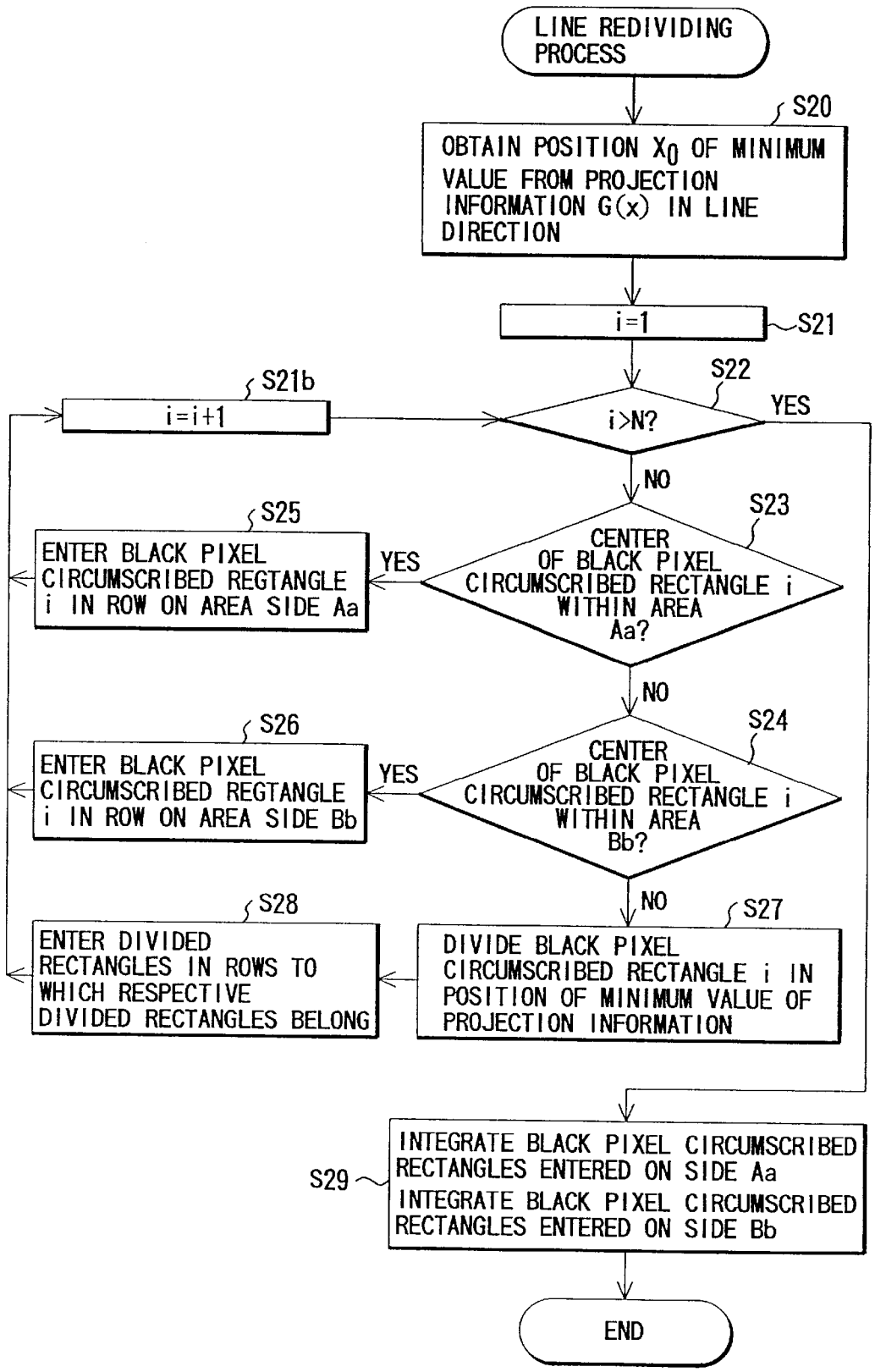
FIG. 11 is a flow chart which explains the dividing process for other lines.

The following describes the dividing process of another line in the line dividing and integrating section 6 on reference to the flow chart shown in FIG. 11. In other words, here, the description is given as to the process for redividing a line in which two lines were detected as one line because a part of the characters of the adjacent lines contact each other.

The following describes the case where a y axis is taken in the line direction of the line candidate area and an x axis is taken in the line perpendicular direction.

Figures 12A, 12B:
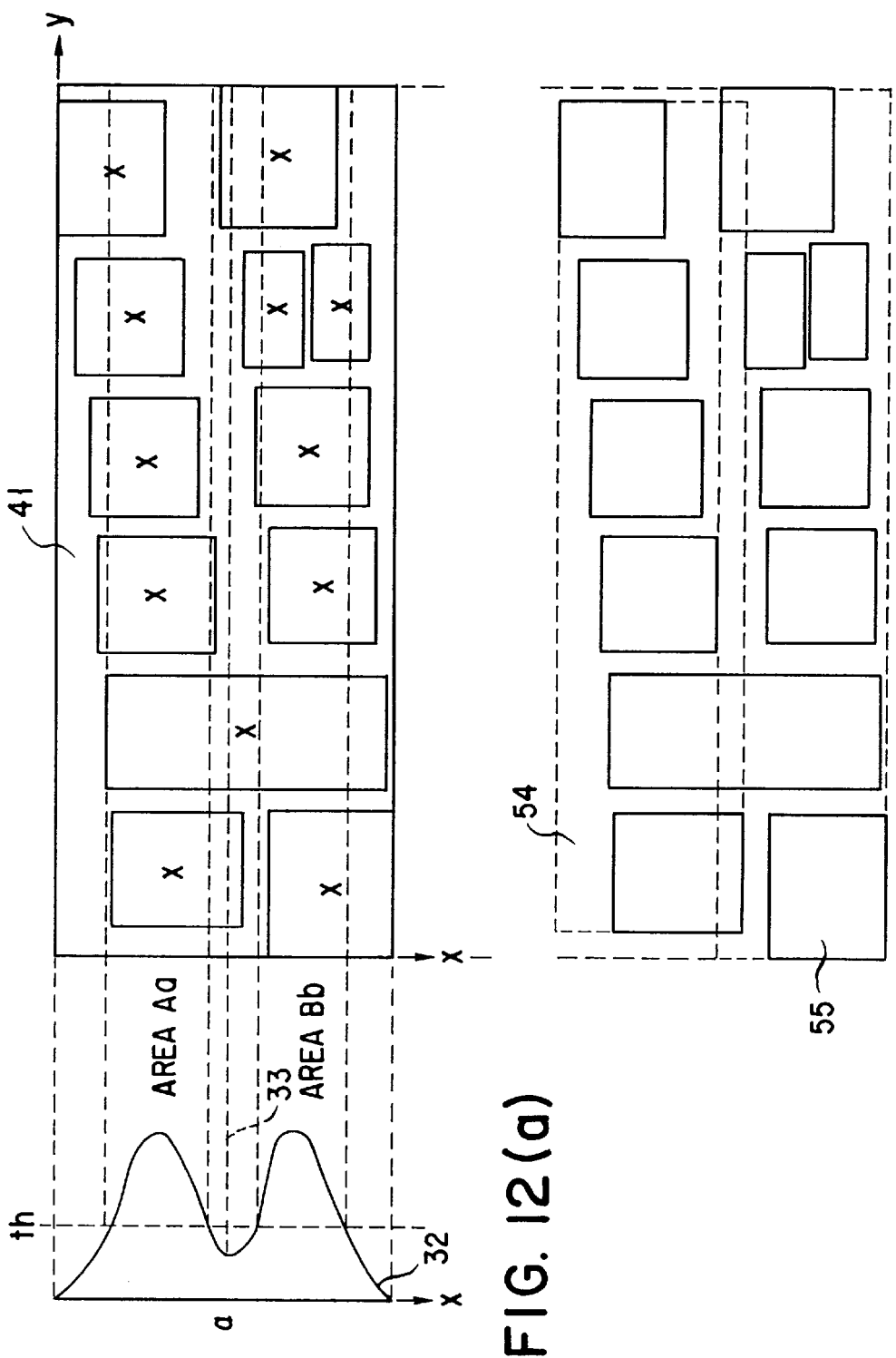
FIG. 12 is a drawing which concretely explains the line dividing process in FIG. 7.

First, similar to the explanation in FIGS. 9 and 10, as shown in (a) on FIG. 12, the a minimum value position of the line direction projection information G(x) in each line candidate area 41, which is calculated in the line direction projection information calculating section 5, is obtained (S20). The minimum value is compared with the predetermined reference value, and if the minimum value is smaller than the reference value, the line is divided in the line perpendicular direction on a basis of x=α (33).

When the line is divided, in the projection information G(x), a range where the value is larger than a predetermined threshold value th on which a size of characters, etc. is considered, namely, areas Aa and Bb in FIG. 12 are obtained. Here, the method for obtaining the areas Aa and Bb according to threshold value th is used, but a method for obtaining a maximum value position from both the sides of the straight line x=α so as to determine Aa and Bb by choosing a constant width range from the position can be considered.

Next, the gravity centers of the black pixel circumscribed rectangles (marked with x of the black pixel circumscribed rectangles in the line candidate area 41 in (a) on FIG. 12) are obtained, and a check is made determine in which to areas Aa and Bb the gravity centers are included (S23 and S24). If the centers are included in the area Aa or Bb, a judgment is made that the respective black pixel circumscribed rectangles belong to the corresponding lines of the areas, and the black pixel circumscribed rectangles are entered distinctively (S25 and S26).

If the gravity centers of a black pixel circumscribed rectangles are not included in the areas Aa and Ba, the sequence goes to S27, the black pixel circumscribed rectangles are respectively divided into two in a position of x=α. Thereafter, the judgment is made that the rectangles belong to lines on a corresponding respective side, to which the gravity centers belong, and the rectangles are entered distinctively (S28).

When the valuations at S23 through S28 as to all the black pixel circumscribed rectangles in the line candidate area 41 are ended (S22), as shown in (b) on FIG. 12, the black pixel circumscribed rectangles which belong to the area Aa are integrated so that a new line 55 is extracted (S29).

Figure 13:
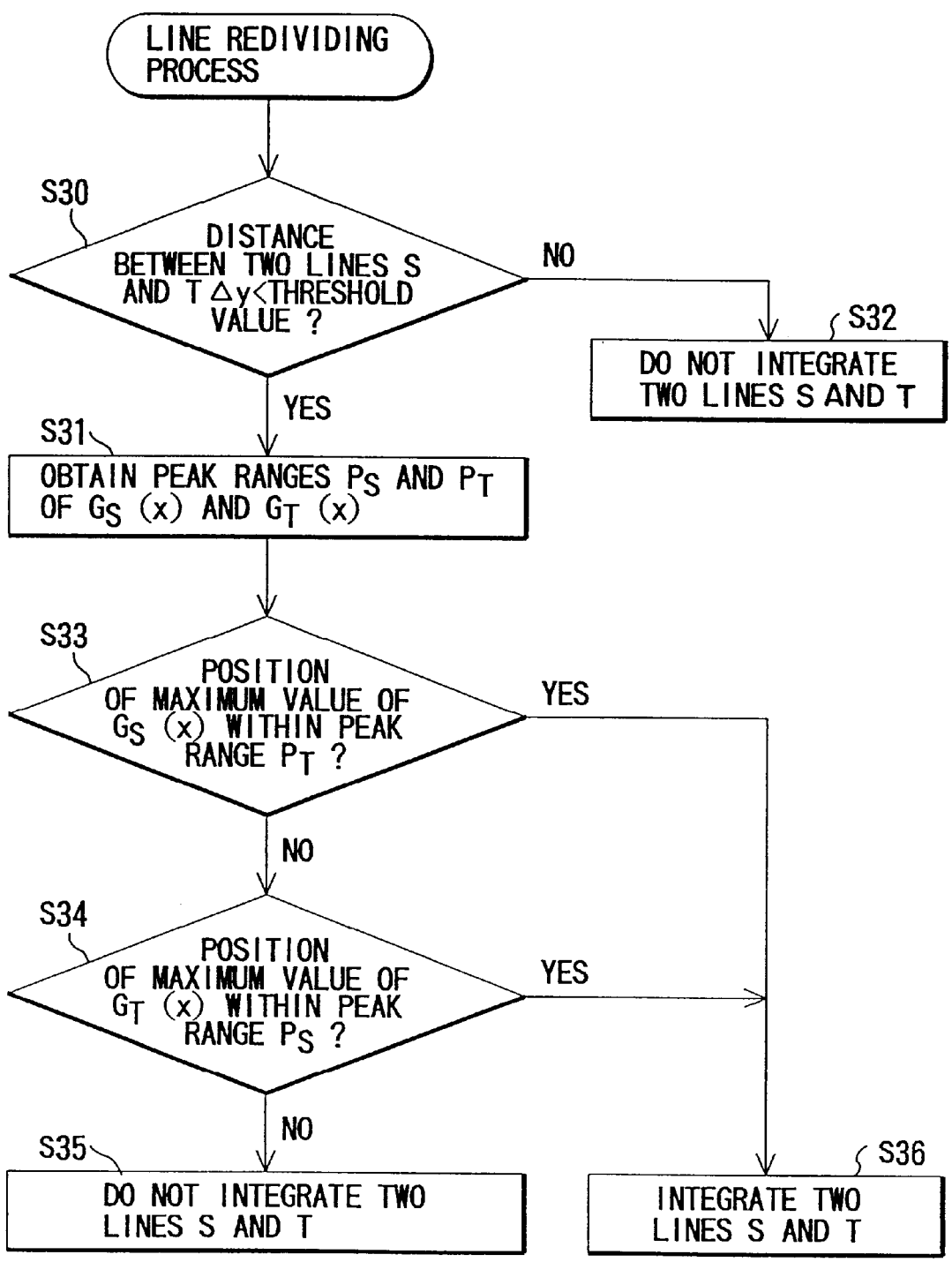
FIG. 13 is a flow chart which explains a line integrating process.

The following describes the line integrating process in the line dividing and integrating section 6 with reference to the flow chart shown in FIG. 13.

In the line candidate detecting section 4 of FIG. 1, when a document is stained, a line is slanted and a size of characters is not uniform, it is strongly possible that one original one line is detected as a plurality of line candidate areas.

Therefore, in the line integrating process of the present invention, lines are integrated based on the line direction projection information which is calculated by using the black pixel circumscribed rectangular information in the line candidate area. A description is given as to the case where the y axis is taken in the line direction and the x axis is taken in the line perpendicular direction in the line candidate area.

Figure 14A:
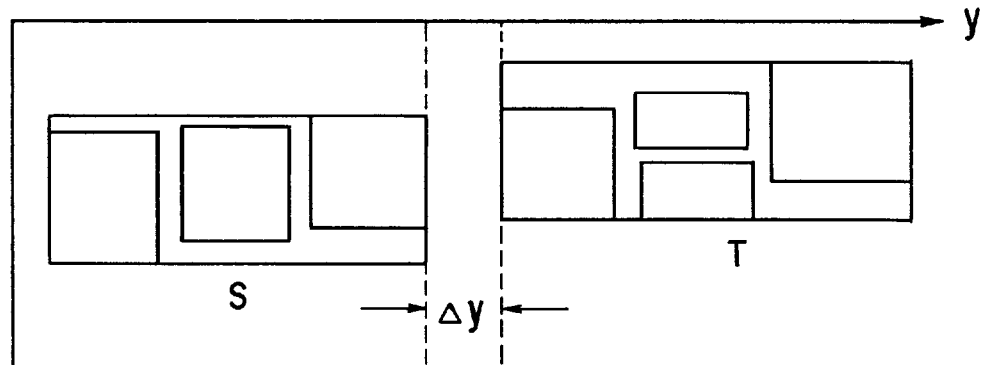
FIG. 14 is a drawing which concretely explains the line integrating process.
Figure 14B:
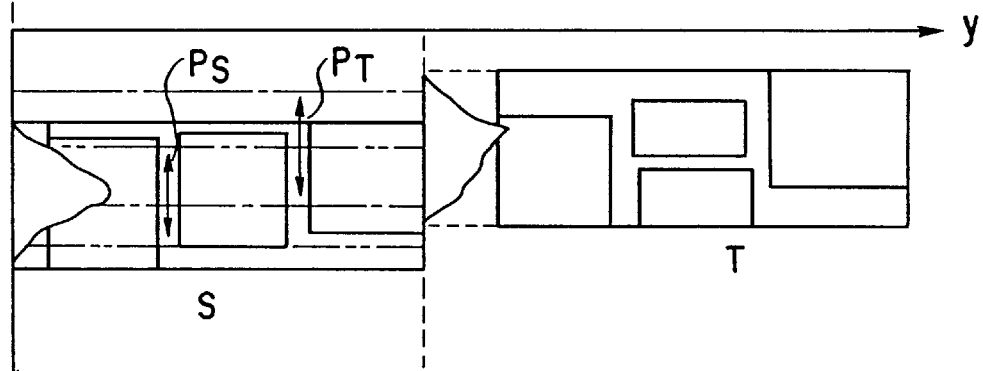
Figure 14C:
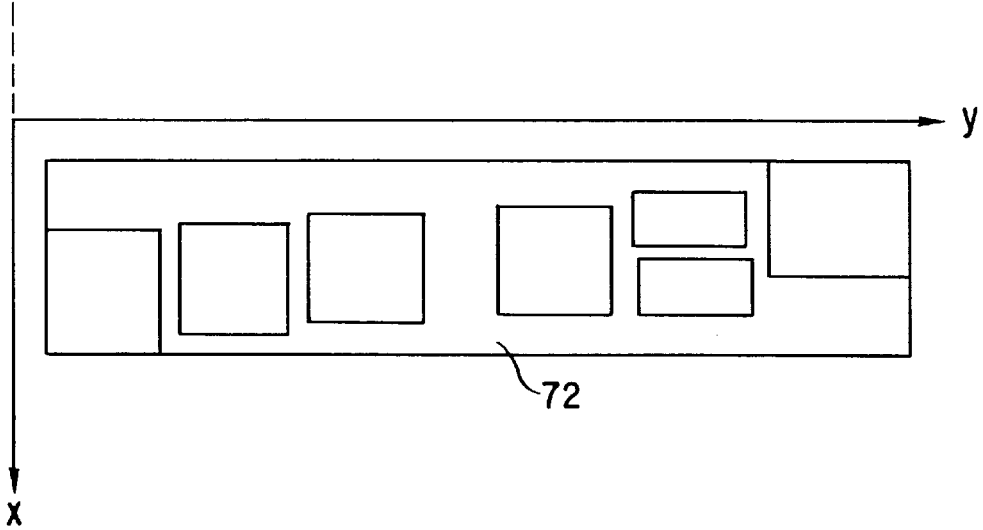

A judgment as to whether or not two line candidate areas S and T shown in (a) on FIG. 14 are integrated is made by making a judgment as to whether or not a distance between lines Δy in the y axial direction is larger than a predetermined fixed threshold value or a threshold value, which was calculated by a predetermined calculating method (S30). If the distance is larger than the threshold value, the judgment is made that the line candidate areas S and T are different. Therefore, they are not integrated (S32). Meanwhile, if Δy is smaller than the threshold value, the sequence goes to S31.

At S31, most probable character line ranges $P_S$ and $P_T$ (refer to (b) on FIG. 14), where a size of characters, etc. is considered, are calculated by a predetermined statistically method based on the respective line direction projection information $G_S(x)$ and $G_T(x)$ in the line candidate areas S and T calculated by the line direction projection information calculating section 5 of FIG. 1.

Next, a check is made as to whether or not the maximum value of $G_S(x)$ falls within the peak range of $P_T$, or as to whether or not the maximum value of $G_T(x)$ falls within the peak range of $P_S$ (S33 and S34).

If at least one condition is satisfied, as shown in (c) on FIG. 14, the line candidate areas S and T are integrated, and the black pixel circumscribed rectangular information which belongs to the line candidate areas A and B are combined into one. As a result, the rectangular information in a line candidate area 72 after the two lines are integrated, and the black pixel circumscribed rectangular information in the line candidate area 72 are obtained (S36). If both of the conditions are not satisfied, the line candidate areas A and B are not integrated (S35).

In the line dividing and integrating sections 6 of FIG. 1, all the line candidates detected by the line candidate detecting section 4 undergo the line dividing and integrating process shown in FIGS. 9, 11 and 13 repeatedly, and just when the line candidates do not undergo the dividing and integrating process, character lines are detected.

As mentioned above, according to the above embodiment, a document image is inputted by the image inputting section 1, and a binarized image, which was obtained by binarizing the document image by the binarizing section 2, is converted into circumscribed rectangular data, in which pixel combining components in the binarized image are obtained by the black pixel combined area extracting section 3. Then, the pixel combining components are integrated and the line candidate area is detected based on the circumscribed rectangular data by the line candidate detecting section 4, and projection information of the circumscribed rectangle is obtained by the line direction projection information calculating section 5 based on the circumscribed rectangular data which respectively belong to the line candidates so that the respective line direction projection information in the line candidate area is calculated based on the projection information of the circumscribed rectangle. Thereafter, the line candidate area undergoes the dividing and integrating process in the line dividing and integrating section 6 based upon the line direction projection information of each calculated line candidate area and the circumscribed rectangular data so that the character lines are detected. Then, when characters are detected from the detected character lines by the character recognition section 7 so that the characters are recognized, the character lines can be detected accurately at a high speed. Therefore, it is possible to recognize the characters at a high speed with a high character recognizing rate.

In addition, the line direction projection information calculating section 5 obtains the projection information $F_i(x)$, where the gravity center position of the circumscribed rectangle is a peak, based on the position and size of the circumscribed rectangle. Then, when the projection information $F_i(x)$ of all the circumscribed rectangles which belong to the respective line candidate areas are superposed with each other, and the line direction projection information G(x) is calculated, the projection information in the line direction can be calculated from the position information and the width information of the black pixel circumscribed rectangles which belong to the respective line candidate areas. For this reason, the projection information in the line candidate areas can be calculated at a high speed.

In addition, in the line dividing and integrating section 6, the maximum point position of the projection value obtained from the line direction projection information in the line candidate area is compared with the center position of each circumscribed rectangles which belongs to the line candidate area so that a dividing position of the line candidate area is obtained, and the line candidate area is divided based on the dividing position. Then, the line direction projection information in the two adjacent line candidate areas is compared with each other, and when the maximum point position of the projection value, which was obtained from the line direction projection information in one line candidate area, falls within a range which is predetermined based on the line direction projection information in the other line candidate area, the dividing judgment and the integrating process can be carried out for more lines than the conventional method within a constant time by integrating the two line candidate areas, and the line detecting ability can be improved. Namely, even if the line is slanted on a document, the line division and integration judging process can be carried out accurately, and since each line candidate has characters which belong to the corresponding line candidates not as pixel information but as rectangular information, characters which goes into from the next line can be easily detected, and the line division judging process can be carried out accurately.

As mentioned above, the present invention can provide the line detecting method at a high speed and with high line detecting accuracy and the character recognition apparatus.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An apparatus for detecting and recognizing a character line using simplified projection information, comprising:

means for binarizing an inputted document image so as to output a binarized image;

means for obtaining a combining component of a black pixel from the binarized image so as to convert the combining component into circumscribed rectangular data;

means for calculating a function based on position data of the circumscribed rectangular data, the function signifying a temporary simplified projection information of the circumscribed rectangular data;

means for calculating an accumulation of the function obtained by the means for calculating the function, the accumulation signifying the temporary simplified projection information of all of the circumscribed rectangular data in a line direction; and means for detecting the character line on the document image based on the accumulation of the function obtained by the means for calculating the accumulation of the function.

2. The apparatus according to claim 1, further comprising means for recognizing characters included in the character line detected by the detecting means.

3. The apparatus according to claim 1, wherein the function calculating means includes means for calculating the simplified projection information having a triangle shape based on the function.

4. The apparatus according to claim 1, wherein the function calculating means includes means for calculating the simplified projection information having a trapezoidal shape based on the function.

5. The apparatus according to claim 1, wherein the character line detecting means comprises:

means for outputting a position of a minimum value of the line direction projection information; and means for dividing the line direction projection information in the position so as to extract a new line when the minimum value is smaller than a predetermined value.

6. The apparatus according to claim 5, wherein the dividing means includes means for calculating a gravity center position of the circumscribed rectangular data, and entering a side of the minimum value to which the gravity center position is positioned.

7. The apparatus according to claim 1, wherein the character line detecting means includes:

means for comparing an interval in a character line direction between a first line direction projection information and a second line direction projection information with a predetermined value; and means for, when the interval is smaller than the predetermined value, integrating the first line direction projection information and the second line direction projection information as a new third line direction projection information so as to detect the character line based on the third line direction projection information.

8. A method for detecting and recognizing a character line using simplified projection information, comprising:

binarizing an inputted document image so as to output a binarized image;

obtaining a combining component of a black pixel from the binarized image so as to convert the combining component into circumscribed rectangular data;

calculating a function based on position data of the circumscribed rectangular data, the function signifying a temporary simplified projection information of the circumscribed rectangular data;

calculating an accumulation of the function, the accumulation signifying the temporary simplified projection information of all of the circumscribed rectangular data in a line direction; and detecting a character line on the document image based on the accumulation of the function.

9. The method according to claim 8, further comprising recognizing characters included in the character line detected in the detecting of the character line.

10. The method according to claim 8, wherein the calculating of the function comprises calculating the simplified projection information having a triangle shape based on the function.

11. The method according to claim 8, wherein the calculating of the function comprises calculating the simplified projection information having a trapezoidal shape based on the function.

12. The method according to claim 8, wherein the detecting of the character line comprises:

outputting a position of a minimum value of the line direction projection information; and dividing the line direction projection information in the position so as to extract a new line when the minimum value is smaller than a predetermined value.

13. The method according to claim 12, wherein the dividing the line direction projection information comprises calculating a gravity center position of the circumscribed rectangular data, and entering a side of the minimum value to which the gravity center position is positioned.

14. The method according to claim 8, wherein the detecting of the character line comprises:

comparing an interval in a character line direction between a first line direction projection information and a second line direction projection information with a predetermined value; and when the interval is smaller than the predetermined value, integrating the first line direction projection information and the second line direction projection information as a new third line direction projection information so as to detect the character line based on the third line direction projection information.

15. A character line recognition apparatus comprising:

means for binarizing an inputted document image so as to output a binarized image;

means for obtaining a combining component of a black pixel from the binarized image so as to convert the combining component into circumscribed rectangular data;

means for calculating simplified projection information based on a prescribed function using the circumscribed rectangular data;

means for calculating line direction projection information based on the prescribed function as the simplified projection information; and means for recognizing a character line on the document image based on the line direction projection information, wherein:

the means for calculating the simplified projection information comprises:

means for calculating the simplified projection information by substituting the respective circumscribed rectangular data into the following prescribed function:

$$F_i(x) = \begin{cases} a(x - X_{si}), & \text{if } X_{si} \leq x < (X_{si} + X_{ei})/2 \\ a(X_{ei} - x), & \text{if } (X_{si} + x_{ei})/2 \leq x \leq X_{ei} \end{cases}$$

where, a is a constant,
$X_{si}$ is an x coordinate of a start position, and
$X_{ei}$ is an x coordinate of an end position.

16. A character line recognition apparatus comprising:

means for binarizing an inputted document image so as to output a binarized image;

means for obtaining a combining component of a black pixel from the binarized image so as to convert the combining component into circumscribed rectangular data;

means for calculating simplified projection information based on a prescribed function using the circumscribed rectangular data;

means for calculating line direction projection information based on the prescribed function as the simplified projection information; and means for recognizing a character line on the document image based on the line direction projection information, wherein:
the means for calculating the simplified projection information comprises:
means for calculating the simplified projection information by substituting the respective circumscribed rectangular data into the following prescribed function:

$$F_i(x, X_i, \Delta Y_i) = \begin{cases} E(\Delta X_i, \Delta Y_i)(x - X_{si}), & \text{if } X_{si} \leq x < (X_{si} + X_{ei})/2 \\ E(\Delta X_i, \Delta Y_i)(X_{ei} - x), & \text{if } (X_{si} + X_{ei})/2 \leq x \leq X_{ei} \end{cases}$$

where, $\Delta X_i = X_{ei} - Y_{si}$,
$\Delta Y_i = Y_{ei} - X_{si}$,
$E(\Delta X, \Delta Y) = a\Delta Y/\Delta X$,
a is a constant,
$X_{si}$ is an x coordinate of a start position, and
$X_{ei}$ is an x coordinate of an end position.

17. A character line recognition apparatus comprising:

means for binarizing an inputted document image so as to output a binarized image;

means for obtaining a combining component of a black pixel from the binarized image so as to convert the combining component into circumscribed rectangular data;

means for calculating simplified projection information based on a prescribed function using the circumscribed rectangular data;

means for calculating line direction projection information based on the prescribed function as the simplified projection information; and means for recognizing a character line on the document image based on the line direction projection information, wherein:
the means for calculating the simplified projection information comprises:
means for calculating the simplified projection information by substituting the respective circumscribed rectangular data into the following prescribed function:

$$F_i(x, X_i, \Delta Y_i) = \min(P_i(x), Q_i(\Delta X_i, \Delta Y_i))$$

$$P_i(x) = \begin{cases} a(x - X_{si})^n, & \text{if } X_{si} \leq x < (X_{si} + X_{ei})/2 \\ a(X_{ei} - x)^n, & \text{if } (X_{si} + X_{ei})/2 \leq x \leq X_e \end{cases}$$

$$Q_i(\Delta X_i, \Delta Y_i) = b\Delta Y_i$$

$$Q_i(\Delta X_i, \Delta Y_i) = b\Delta Y_i,$$

where, $\Delta X_i = X_{ei} - Y_{si}$,
$\Delta Y_i = Y_{ei} - X_{si}$,
$E(\Delta X, \Delta Y) = a\Delta Y/\Delta X$,
a is a constant,
$X_{si}$ is an x coordinate of a start position, and
$X_{ei}$ is an x coordinate of an end position.

18. A character line recognition method comprising:

binarizing an inputted document so as to output a binarized image;

obtaining a combining component of a black pixel from the binarized image so as to convert the combining component into circumscribed rectangular data;

calculating simplified projection information based on a prescribed function using the circumscribed rectangular data;

calculating line direction projection information based on the prescribed function as the simplified projection information; and recognizing a character line on the document image based on the line detection projection information, wherein:
the calculating the simplified projection information comprises:
calculating the simplified projection information by substituting the respective circumscribed rectangular data into the following prescribed function:

$$F_i(x) = \begin{cases} a(x - X_{si}), & \text{if } X_{si} \leq x < (X_{si} + X_{ei})/2 \\ a(X_{ei} - x), & \text{if } (X_{si} + x_{ei})/2 \leq x \leq X_{ei} \end{cases}$$

where, a is a constant,
$X_{si}$ is a x coordinate of a start position, and
$X_{ei}$ is a x coordinate of an end position.

19. A character line recognition method comprising:

binarizing an inputted document so as to output a binarized image;

obtaining a combining component of a black pixel from the binarized image so as to convert the combining component into circumscribed rectangular data;

calculating simplified projection information based on a prescribed function using the circumscribed rectangular data;

calculating line direction projection information based on the prescribed function as the simplified projection information; and recognizing a character line on the document image based on the line detection projection information, wherein:
the calculating the simplified projection information comprises:
calculating the simplified projection information by substituting the respective circumscribed rectangular data into the following prescribed function:

$$F_i(x, X_i, \Delta Y_i) = \begin{cases} E(\Delta X_i, \Delta Y_i)(x - X_{si}), & \text{if } X_{si} \leq x < (X_{si} + X_{ei})/2 \\ E(\Delta X_i, \Delta Y_i)(X_{ei} - x), & \text{if } (X_{si} + X_{ei})/2 \leq x \leq X_{ei} \end{cases}$$

where, $\Delta X_i = X_{ei} - Y_{si}$,
$\Delta Y_i = Y_{ei} - X_{si}$,
$E(\Delta X, \Delta Y) = a\Delta Y/\Delta X$,
a is a constant
$X_{si}$ is an x coordinate of a start position, and
$X_{ei}$ is an x coordinate of an end position.

20. A character line recognition method comprising:

binarizing an inputted document so as to output a binarized image;

obtaining a combining component of a black pixel from the binarized image so as to convert the combining component into circumscribed rectangular data;

calculating simplified projection information based on a prescribed function using the circumscribed rectangular data;

calculating line direction projection information based on the prescribed function as the simplified projection information; and recognizing a character line on the document image based on the line detection projection information, wherein:

the calculating the simplified projection information comprises:

calculating the simplified projection information by substituting the respective circumscribed rectangular data into the following prescribed function:

$$F_i(x, X_i, \Delta Y_i) = \min(P_i(x), Q_i(\Delta X_i, \Delta Y_i))$$

$$P_i(x) = \begin{cases} a(x - X_{si})^n, & \text{if } X_{si} \leq x < (X_{si} + X_{ei})/2 \\ a(X_{ei} - x)^n, & \text{if } (X_{si} + X_{ei})/2 \leq x \leq X_e \end{cases}$$

$$Q_i(\Delta X_i, \Delta Y_i) = b\Delta Y_i$$

where, $\Delta X_i = X_{ei} - Y_{si}$, $\Delta Y_i = Y_{ei} - X_{si}$, $E(\Delta X, \Delta Y) = a\Delta Y/\Delta X$, a is a constant, $X_{si}$ is an x coordinate of a start position, and $X_{ei}$ is an x coordinate of an end position.

* * * * *